Sept. 13, 1932.   B. E. HORNE   1,876,938
PRESSURE RELIEF VALVE
Filed Jan. 23, 1929
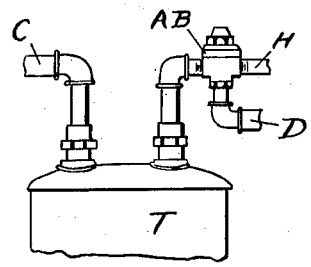
Fig. 1.
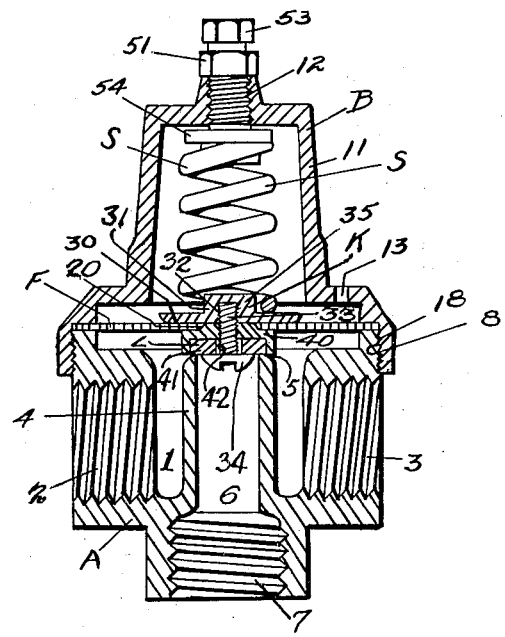
Fig. 2.
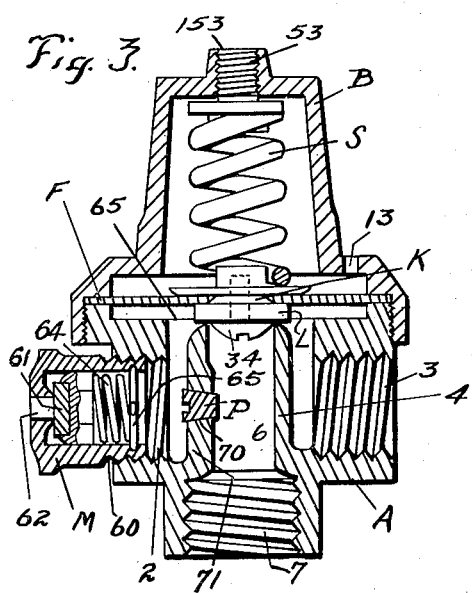
Fig. 3.
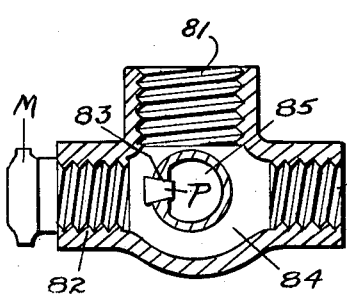
Fig. 5.
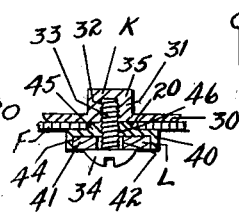
Fig. 6.
Fig. 4.
INVENTOR.
BY Burchard E. Horne
ATTORNEY.

Patented Sept. 13, 1932

1,876,938

UNITED STATES PATENT OFFICE

BURCHARD E. HORNE, OF ANDOVER, MASSACHUSETTS

PRESSURE RELIEF VALVE

Application filed January 23, 1929. Serial No. 334,478.

This invention relates to what are known as relief valves.

It is principally intended for use in connection with hot water heating systems, but may be used in other connections, and it may also be adapted, in some cases, for use not only as a pressure relief valve but as a temperature and vacuum relief valve.

It may be installed in the hot water pipe leading from the well-known storage tank or domestic range boiler for storing water for the taps in such manner that the water is circulating around the seat at all times, or it may be slightly modified and used on a dead end.

It may also be used in connection with a hot water house heating system.

I prefer to locate it where the water will circulate around the seat because this circulation keeps out the dirt and rust and the products of electrolysis.

My valve seat is annular and relatively sharp at the top, and as the diaphragm which operates the valve disc is relatively very large, the water circulation and the size of the diaphragm as well as the general construction make it almost impossible for the valve to stick. When once set for a given pressure, it will almost always work at that pressure.

Besides this, by making a valve disc holder with a closed top, there is little likelihood of the water working through the diaphragm and filling the dome, thereby choking the valve action.

Besides this, I prefer to use an air vent above the diaphragm which permits air to move in and out, and, if there is any water which works through, this is also released.

I use no guides for my valve and therefore avoid any danger of the guides sticking or jamming.

My valve is very simple and easily assembled and cleaned.

My preferred construction of attaching the valve disc to the diaphragm is ordinarily leak-tight, but if the parts should wear and water should work in above the diaphragm, my air vent will not only allow the water to escape without filling the chamber whereby the disc might be prevented from moving from its seat, but the water will come out of the air vent and act as a signal to show that the valve needs attention. I prefer to locate this air vent at the bottom rather than at the top of the dome so that this signal will be quickly given and so that in case of a leak, there would be less waste of water.

Preferably also I locate my valve seat a little above the direct flow of the water so that while it is kept constantly clean, it is not as likely to catch sediment and rust as might be the case if it were located at the bottom of the flow.

While my water space is preferably annular, it may be of some other shape.

In the drawing, Fig. 1 is an elevation showing one position of my relief valve.

Fig. 2 is a vertical section showing the simplest form of my valve.

Fig. 3 shows a modified construction in which the pressure adjusting means is sealed and the valve is provided with a vacuum release and temperature release device.

Fig. 4 is an elevation showing a position of the construction of valve shown in Fig. 3.

Fig. 5 is a small horizontal section of a slight modification in which the valve is formed as an elbow joint.

Fig. 6 is a vertical section showing the disc holder with the disc and diaphragm in detail.

In the drawing, T represents a tank shown as of the household tap water type generally used for storing hot water for bathroom and kitchen use. C indicates the cold water inlet pipe, and H indicates the hot water outlet pipe, and D indicates a drain pipe.

The main purpose of such a valve is to relieve the pressure, if for any reason the water gets over-heated and forms steam. In such case, my valve A, B functions and permits a certain amount of the hot water to run off through drain pipe D thereby relieving the pressure.

A represents the casing which is formed with an annular water space 1 open at the top and having inlet and outlet passages 2 and 3. As shown, these are oppositely disposed.

4 represents a cylindrical outlet which extends up concentrically in the water space 1 and terminates in the valve seat 5 for valve disc L. The passage 6 in outlet 4 connects with the threaded part 7 into which a drain pipe such as D can be screwed when desired. If a drain pipe is not needed, the part 7 serves as the mouth of the cylindrical outlet 4.

B is a dome shown as having interior threads 18 by which it can be screwed on the exterior threads 8 of casing A.

I provide the passage 13 which serves as a dome outlet for air and water and at the top of the dome, there is an adjusting screw hole 12. The constricted part of the dome 11 serves as a housing for the spring S.

F is a diaphragm of circular or disc shape of a size to fit on the top of casing A above the threads 8 and between the casing and the dome B. When these parts are screwed together the diaphragm is firmly held around its rim. It has preferably at its center a screw and boss hole 20.

L is a disc including metal cup 40 and ring or disc 41 of fiber or other suitable material and is so positioned that it will normally rest on annular seat 5 which is at the top end of passage 6 and thereby close this passage. It is shown as comprising a ring of suitable material 41 through the center of which is a hole 42 of a size through which fastening screw 33 snugly fits.

Ring or disc 41 is firmly pressed into an opening 44 in the bottom of a metal cup 40 and this metal cup has at the top a shallow boss 45 about the thickness of diaphragm F and has a threaded hole 46 into which the threaded shank of disc screw 33 fits.

K represents a disc holder which includes disc screw 33 having a threaded shank which passes through the diaphragm hole 20 and has a head 34. Disc holder K also includes the cap 35 having a flat base 30 which rests snugly on diaphragm F and a boss 31 which serves as a bottom bearing for spring S and as a housing for the dead end threaded hole 32 into which fastening screw 33 passes.

I prefer to use a round head 34 for the fastening screw so that there will be as little obstruction as possible to the water when the valve opens.

By so constructing my disc and holder, the fiber part 41 of the disc L is held firmly in the cup 40 and when screw 33 is passed through hole 20 in the diaphragm into the threaded hole 32 of the cap 35 the parts are clamped firmly in position with very little chance of leaks or loosening.

S represents adjustable spring pressure means positioned between the boss 31 of holder K and a spring adjusting screw 53 which extends down through a lock nut 51 and engages the bossed spring washer 54. Between this bossed spring washer 54 and the boss 31 of disc holder K the spring S is firmly held.

The construction shown in Fig. 1 is suitable where water flows through the hot water pipe H and the arrangement of the annular space 1 and annular outlet 4 is such that the water moving along and around washes away any dirt, rust or sediment from the valve disc and seat whereby any danger of sticking or leaking is avoided.

As shown in Figs. 3 and 4, instead of placing my valve in a hot water circuit, as shown in Fig. 1, I can put it on a dead end such as 59.

When so positioned, I can use a vacuum relief member indicated by M which comprises a tubular casing threaded at 60 so as to be screwed into a passage such as 2. This member M has an air inlet hole 62 normally kept closed by means of the disc 61 which is pressed from the inside against it by spring 64, the other end of which is held by a skeleton 65. Normally the pressure is from the inside and together with the spring 64 the air inlet 62 is kept closed, but if a vacuum is created in the system, disc 61 is drawn away from its seat and air is allowed to enter.

With this construction, I can also use a fusible plug P driven into a suitable hole 70 in an enlargement 71 of the annular outlet 4 whereby, if the temperature rises to a certain point, plug P will melt and the heated water is allowed to run out through hole 70 into the drain.

In order to meet the requirements of certain purposes, I show in Fig. 3 the adjusting screws 53 cut off at 153 so that it cannot easily be turned and so that it can therefore be set in advance for a given pressure.

As shown in Fig. 5, I may use an inlet 80 and outlet 81 at right angles, one to the other, and if desired, a plug passage 82 which may be stopped up by a solid plug, or which may be used for a vacuum vent M.

In this construction, I show a water space 84 which is not annular, but the outlet 85 is preferably tubular, while the dome, diaphragm, disc holder and other parts are the same as in Fig. 2.

I show also a fusible plug P driven into a plug hole 83 in outlet 85.

I claim:

1. A diaphragm relief valve comprising a casing having a water space which is open at the top, and having inlet and outlet passages from said water space together with a cylindrical outlet which extends up into such water space and has at the top a valve seat above the top of said inlet and connects at the bottom with a waste opening; a dome attached to said casing and extending upwardly over said valve seat, said dome having an outlet near its bottom and having at the top an adjusting screw hole; a diaphragm fixed between the dome and the casing below the dome outlet; and a disc holder comprising a cap having a dead end threaded hole positioned centrally on the top of the diaphragm, and having a round headed fastening screw which extends from underneath up through the diaphragm into said hole; together with a valve disc held by said fastening screw against the lower side of the diaphragm proximate to the valve seat, said disc comprising a metal cup with a threaded hole for the fastening screw and a cylindrical recess into which a fibre washer is pressed, the flat face of the washer normally resting on the top rim of the valve seat; and adjustable spring pressure means positioned between said holder and a spring adjusting screw which extends through the adjusting screw hole.

2. The combination in a diaphragm relief valve having a casing, a water space, and a diaphragm; of a disc holder comprising a cap having a dead end threaded hole positioned centrally on the top of the diaphragm, and having a headed fastening screw which extends from underneath up through the diaphragm into said hole; and a valve disc held by said fastening screw against the lower side of the diaphragm, said disc comprising a metal cup with a threaded hole for the fastening screw and at the bottom a cylindrical recess into which a ring or disc of fiber or other suitable material is pressed.

3. A diaphragm relief valve comprising a casing having an annular water space which is open at the top, and having oppositely disposed inlet and outlet passages from said water space together with a cylindrical outlet which extends up into such water space and has at the top an annular upwardly projecting valve seat and connects at the bottom with a waste opening; a dome attached to said casing and extending upwardly over said valve seat, said dome having an outlet and having at the top an adjusting screw hole; a diaphragm fixed between the dome and the casing below the dome outlet; and a disc holder comprising a cap having a dead end threaded hole positioned centrally on the top of the diaphragm, and having a fastening screw which extends from underneath up through the diaphragm into said hole; together with a valve disc held by said fastening screw against the lower side of the diaphragm proximate to and normally resting on the top rim of the valve seat; and adjustable spring pressure means positioned between said holder and a spring adjusting screw which extends through the adjusting screw hole.

4. A diaphragm relief valve comprising a casing having a water space which is open at the top, and having inlet and outlet passages from said water space together with a cylindrical outlet which extends up into said water space and has at the top an annular upwardly projecting valve seat and connects at the bottom with a waste opening; a dome attached to said casing and extending upwardly over said valve seat, said dome having an outlet and having at the top an adjusting screw hole; a diaphragm fixed between the dome and the casing below the dome outlet; and a disc holder comprising a cap and a fastening screw; together with a valve disc held by said fastening screw against the lower side of the diaphragm proximate to and normally resting on the top rim of the valve seat; and adjustable spring pressure means positioned between said holder and a spring adjusting screw which extends through the adjusting screw hole.

5. A diaphragm relief valve comprising a casing having a water space which is open at at the top, and having inlet and outlet passages from said water space together with a cylindrical outlet which extends up into such water space and has at the top an annular upwardly projecting valve seat and connects at the bottom with a waste opening; a dome attached to said casing and extending upwardly over said valve seat, said dome having an outlet; a diaphragm fixed between the dome and the casing below the dome outlet; and a valve disc held against the lower side of the diaphragm proximate to and normally resting on the top rim of the valve seat; and spring pressure means between the top of the diaphragm and the dome.

6. A diaphragm relief valve comprising a casing having a water space which is open at the top, and having inlet and outlet passages from said water space together with a cylindrical outlet which extends up into said water space and has at the top an annular upwardly projecting valve seat and connects at the bottom with a waste opening; a dome attached to said casing and extending upwardly over said valve seat; a diaphragm positioned between the dome and the casing; a valve disc attached centrally to the lower side of the diaphragm proximate to the valve seat, the flat face of the disc engaging the flat face of the valve seat; and means to exert pressure on the upper side of the diaphragm.

7. A diaphragm relief valve comprising a casing having a water space which is open at the top, and having inlet, plug and outlet passages from said water space together with a tubular outlet which has a fusible plug hole opposite the plug passage and extends up into such water space and has at the top a valve seat and connects at the bottom with a waste opening; a dome attached to said casing and extending upwardly of said valve seat; a diaphragm positioned between the dome and the casing; a valve disc attached centrally to the lower side of the diaphragm proximate to the valve seat; a fusible plug in the plug hole; a vacuum relief valve in the plug passage; and means to exert pressure on the upper side of the diaphragm.

BURCHARD E. HORNE.